United States Patent
Puff et al.

(10) Patent No.: US 9,461,528 B2
(45) Date of Patent: Oct. 4, 2016

(54) DEFORMATION CONTROL DEVICE FOR A RESONANT SPRING IN A LINEAR DRIVING UNIT

(71) Applicant: Whirlpool S.A., São Paulo-Sp (BR)

(72) Inventors: Rinaldo Puff, Joinville-Sc (BR); Alexandre Rafael Schroeder, Joinville-Sc (BR)

(73) Assignee: Whirlpool S.A., São Paulo-Sp (BR)

( * ) Notice: Subject to any disclaimer, the term of this patent is extended or adjusted under 35 U.S.C. 154(b) by 0 days.

(21) Appl. No.: 14/359,746

(22) PCT Filed: Nov. 23, 2012

(86) PCT No.: PCT/BR2012/000472
§ 371 (c)(1),
(2) Date: May 21, 2014

(87) PCT Pub. No.: WO2013/075197
PCT Pub. Date: May 30, 2013

(65) Prior Publication Data
US 2014/0327328 A1 Nov. 6, 2014

(30) Foreign Application Priority Data

Nov. 25, 2011 (BR) ...................................... 1105017

(51) Int. Cl.
*H02K 33/02* (2006.01)
*F04B 35/04* (2006.01)
(Continued)

(52) U.S. Cl.
CPC ............. *H02K 33/02* (2013.01); *F04B 35/045* (2013.01); *F04B 39/0022* (2013.01); *F04B 39/0044* (2013.01); *F04B 39/127* (2013.01); *F16F 1/041* (2013.01)

(58) Field of Classification Search
CPC ...... H02K 33/00; H02K 33/02; H02K 33/10; H02K 33/18; F16F 1/041; F04B 39/044; F04B 39/0022; F04B 39/127; F04B 35/045
USPC ...... 254/10.5; 403/229; 267/287; 310/12.01, 310/12.02, 12.12, 12.13, 12.14
See application file for complete search history.

(56) References Cited

U.S. PATENT DOCUMENTS 2,815,201 A 12/1957 Girod-Eymery
3,161,407 A 12/1964 Robin
(Continued)

FOREIGN PATENT DOCUMENTS

GB 671798 A 5/1952
GB 2242723 A * 10/1991
(Continued)

OTHER PUBLICATIONS

International Search Report and Written Opinion dated Mar. 8, 2013, International Application No. PCT/BR2012/000472.

*Primary Examiner* — Terrance Kenerly
*Assistant Examiner* — Alexander Singh
(74) *Attorney, Agent, or Firm* — Dinsmore & Shohl LLP

(57) ABSTRACT

The present device is applied to a linear driving unit which comprises: a linear electric motor (M) formed by a motor housing (C) which is electrically excited and affixed to a fixed structure (1), and by a magnetic armature (A) which is displaced in a reciprocating axial movement; and a helical resonant spring (50) having an end coupled to the fixed structure (1) and an opposite end coupled to the magnetic armature (A). The deformation control device (60) is mounted to contact a surface extension of the resonant spring (50), which is elastically and radially deformed, and to generate friction with said surface extension and/or an elastic deformation in the deformation control device (60), absorbing energy in a value sufficient to at least minimize said radial elastic deformation of the resonant spring (50).

4 Claims, 6 Drawing Sheets

(51) Int. Cl.
*F04B 39/00* (2006.01)
*F04B 39/12* (2006.01)
*F16F 1/04* (2006.01)

(56) References Cited

U.S. PATENT DOCUMENTS 3,711,917 A * 1/1973 Baumgras .................... 148/537
3,773,309 A * 11/1973 Carter .......................... 267/287
3,866,896 A * 2/1975 Wehner ........................ 267/287
4,869,471 A * 9/1989 Schwarz et al. ................ 267/33

FOREIGN PATENT DOCUMENTS

| WO | 0118393 A1 | 3/2001 |
| WO | 2009076734 A1 | 6/2009 |
| WO | WO 2009076734 A1 * | 6/2009 |
| WO | 2011082461 A1 | 7/2011 |

* cited by examiner

DEFORMATION CONTROL DEVICE FOR A RESONANT SPRING IN A LINEAR DRIVING UNIT

FIELD OF THE INVENTION

The present invention refers to a device for controlling certain deformations of the resonant spring of a linear driving unit, such as, for example, the linear motor of a refrigeration compressor, comprising a motor housing, which is electrically excited and affixed to a fixed structure, and a magnetic armature which is displaced, by the electric excitation of the motor housing, in a reciprocating axial movement. When applied to refrigeration compressors, the magnetic armature is coupled, on one side, to a piston to be displaced in the interior of a cylinder or compression chamber and, on the other side, to an end of a helical resonant spring, whose opposite end is affixed to said fixed structure.

The present invention can be applied to linear compressors, or to any other type of construction which uses a resonant spring, operating in conjunction with an electric linear driving unit, for avoiding the radial elastic deformations of the resonant spring from negatively affecting the operation of the element to be linearly and reciprocally displaced by the driving unit, generally in the interior of a cooperating element, as it occurs in the operational relationship between the piston and the cylinder of a refrigeration compressor.

PRIOR ART

Helical springs are commonly used as elements for storing potential energy in resonant systems used in several applications, such as in linear driving units, for example the linear motors of refrigeration compressors.

As exemplarily illustrated in FIG. 1 of the appended drawings, the compressors which are generally used for refrigeration and driven by an electric motor of the linear type, comprise a housing 1, generally hermetic and which houses a non-resonant assembly including a cranckcase 10 which can be mounted in the housing 1 by means of suspension springs 11, for example, springs of the helical type.

The crankcase 10 incorporates a cylinder 12, in the interior of which is defined a compression chamber 13, having an end 13a generally closed by a valve plate and by a head 25, and an open opposite end 13b through which is mounted a piston 20 reciprocating in the interior of the compression chamber 13. The piston 20 is coupled, through a coupling means, generally in the form of a rod 30, to a magnetic armature A, carrying magnets 40 of a linear motor M which further comprises a motor housing C, affixed to a fixed structure and which is electrically excited so as to displace, axially and reciprocally, the magnetic armature A.

In the construction of the linear driving unit of a refrigeration compressor, the motor housing C can be directly affixed to the housing 1 of said compressor, or to any of the component parts of the non-resonant assembly of said compressor, such as, for example and as illustrated, the crankcase 10 thereof. The housing 1 of the compressor defines, in this case, a fixed structure for the fixation of the motor housing C.

The linear motor M is responsible for generating the necessary drive for displacing the piston 20 in the interior of the compression chamber 13 of the cylinder 12 and, consequently, for the compression of the refrigerant fluid, in the form of gas.

To the movable assembly defined by the piston, rod, and magnetic armature is coupled a resonant spring means, generally comprising at least one helical resonant spring 50, which is mounted so as to exert opposite axial forces on the piston 20, upon its reciprocating axial displacement in the interior of the compression chamber 13. The resonant spring 50 operates as a guide for the axial displacement of the piston 20, and also actuates on the compression movable assembly, jointly with the linear motor M of the compressor. The compression movable assembly (piston-rod-magnetic armature) and the resonant spring 50 define the resonant assembly of the compressor. In the prior art construction, exemplified in FIG. 1, the resonant spring 50 has a helical shape, having an end 50a coupled to the fixed structure, and an opposite end 50b coupled to the magnetic armature A, so as to be axially and elastically deformed, jointly with the reciprocating axial movement of the magnetic armature A. In the illustrated construction, the ends 50a and 50b of the resonant spring 50 are respectively affixed to the non-resonant assembly, for example, to the crankcase 10 or to the support structure thereof, and to the compression movable assembly.

The actuation of the resonant spring causes a great deformation in a main vibration mode (axial elastic deformation), which is the mode responsible for the correct coaxial positioning of the piston 20 in the interior of the cylinder 10, during the operation of the compressor. The deformation of the resonant spring 50 in the main vibration mode is proportional to its capacity of storing and restoring the energy for moving the piston 20.

While it is desirable to have a great capacity of deformation of the resonant spring 50 in a determined vibration mode, the other vibration modes are, as a rule, undesirable. Torsional and radial modes may generate great tensions and displacements of the piston 20 in undesirable non-axial directions, leading the compressor to present catastrophic failures.

At present, the control of the presence of undesirable vibration modes resulting from the actuation of the resonant spring 50 is obtained by avoiding, in the project, the existence of such modes, that is, modes close to the frequency harmonic of the compressor operation, and by avoiding such undesirable vibration modes of the resonant spring 50 from being provoked by movement of the magnetic armature A of the electric motor M, upon operation of the compressor.

Nevertheless, in compressors that work with variable capacity (or variable operating frequency), said control is difficult to implement, due to the fact that the compressor no longer operates in a fixed fundamental frequency, but within a range of frequencies, facilitating the potential of exciting the undesirable modes.

SUMMARY OF THE INVENTION

In view of the above, the present invention has the generic object to provide a deformation control device for a resonant spring in a linear driving unit, which allows, by means of a simple construction, to control the deformation of the resonant spring, limiting said deformation to a determined main vibration mode, minimizing or even eliminating the undesirable other vibration modes, during the whole useful life of the linear driving unit, preserving the energy of the main vibration mode and without requiring alterations in the constructive characteristics of the resonant spring.

The present invention has also the object to provide a control device, such as cited above and which allows controlling and minimizing the lateral and torsional displacements of the resonant spring resulting from said undesirable vibration modes.

It is a further object of the present invention to provide a control device, such as cited above and which, in the case of the refrigeration compressors, can guarantee the spring/piston/cylinder alignment, reducing the tensions on the spring wire during the useful life of the compressor.

In order to comply with the objectives cited above, the present invention proposes a deformation control device for a resonant spring in a linear driving unit, of the type which comprises: a linear electric motor formed by a motor housing, which is electrically excited and affixed to a fixed structure, and by a magnetic armature displaced by the electric excitation of the motor housing, in a reciprocating axial movement; and a helical resonant spring, having an end coupled to the fixed structure, and an opposite end coupled to the magnetic armature, in order to be displaced by the latter and elastically deformed, in a reciprocating axial movement. According to the invention, the deformation control device for a resonant spring in a linear driving unit is mounted to the resonant spring, in order to maintain contact with a surface extension of the resonant spring, which is elastically and radially deformed upon the reciprocating axial movement of said resonant spring, and to generate at least one of the conditions: of friction with said surface extension of the resonant spring; and of elastic deformation of said deformation control. The device, absorbing energy in a value sufficient to at least minimize said radial elastic deformation of the resonant spring.

According to a particular aspect of the present invention, the deformation control device is provided around and along a wire extension of the resonant spring.

According to a constructive form of the present invention, the deformation control device is defined by a damping spring in the form of a cylindrical helical spring which is mounted, directly and tightly, around said wire extension of the resonant spring.

According to another constructive form of the present invention, the deformation control device is defined by a tubular coating which surrounds, integrally and circumferentially, said wire extension of the resonant spring, maintaining direct contact with the latter or being provided around the damping spring, when present.

BRIEF DESCRIPTION OF THE DRAWINGS

The invention will be described below, making reference to the appended drawings, given by way of example of embodiments of the invention and in which:

FIGS. 7A and 7B represent cross-sectional views of the deformation control device of FIG. 7 and of the resonant spring, illustrating, respectively, a pre-mounting condition and a final mounting condition of the deformation control device in relation to the resonant spring.

DETAILED DESCRIPTION OF THE INVENTION

Figure 1:
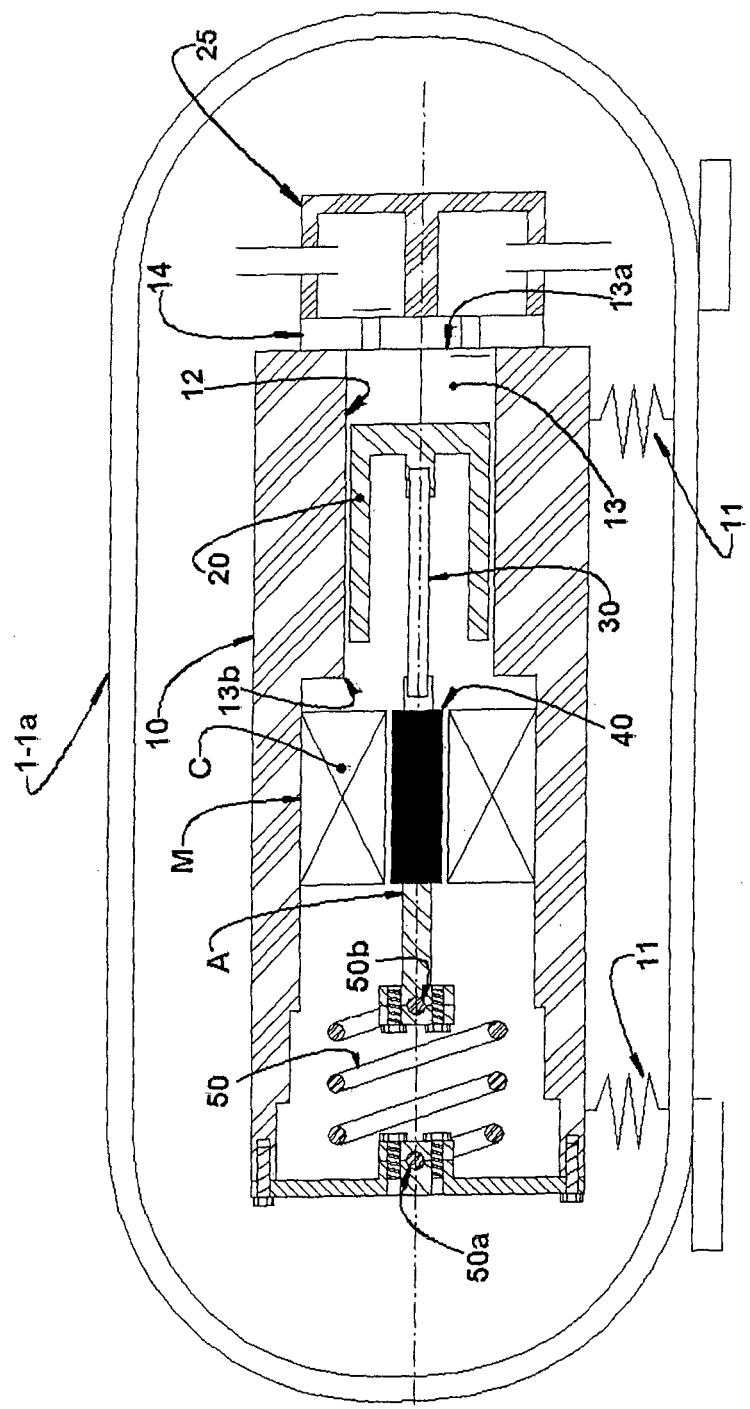
FIG. 1 represents a schematic and simplified longitudinal sectional view of a compressor driven by a linear motor and having the resonant spring mounted to the parts of compression movable assembly and non-resonant assembly, according to a prior art arrangement, deprived of the present control device.

The present invention comprises a deformation control device for a resonant spring, which can be applied to any linear driving unit and of the type comprising: a linear electric motor M formed by a motor housing C, electrically excited and affixed to a fixed structure 1, and by a magnetic armature A displaced by the electric excitation of the motor housing C, in a reciprocating axial movement; and a helical resonant spring 50, having an end 50a of its spring wire coupled to the fixed structure 1, and an opposite end 50b coupled to the magnetic armature A, in order to be, by the latter, axially and reciprocally displaced during the operation of the compressor.

The present invention will be described, considering a particular form of a linear driving unit, such as a refrigeration compressor of the type driven by a linear motor M. It should be understood that, although the linear driving unit, illustrated in FIG. 1 and described in the introduction of the present specification, is exemplified by a refrigeration compressor, the concept presented herein can be applied to any linear driving unit with the fundamental characteristics defined herein. For the application in a refrigeration compressor, the fixed structure 1 is defined by the housing 1a of said compressor.

The present invention proposes a deformation control device 60, for limiting the deformation of the resonant spring 50, of the type mentioned above.

The construction of the compressor of FIG. 1 represents the already discussed prior art, which does not provide the damping of the undesirable vibration modes resulting from the operation of the resonant spring 50.

The deformation control device 60 of the present invention is mounted to the resonant spring 50, in such a way as to contact a surface extension of the wire of the resonant spring 50 subject to radial elastic deformations upon the reciprocating axial movement of the magnetic armature A.

The deformation control device 60 is constructed and mounted to the resonant spring 50 so as to produce, during the axial elastic deformation of the latter, at least one of the following operational conditions: generation of friction force between the deformation control device 60 and the resonant spring 50; and/or generation of elastic deformation force of the deformation control device 60, said operational conditions absorbing energy in a value sufficient to minimize or even eliminate the undesirable radial elastic deformations of the resonant spring 50.

The present invention allows controlling the deformations in determined points of the resonant spring 50 by the addition of structural damping. The points of application should be selected by observing the structural modes considered as undesirable (detrimental), and by preserving the deformation energy of the fundamental mode (elastic axial deformation).

The deformation control device 60 of the present solution controls the lateral and torsional displacements of the resonant spring 50, guaranteeing the spring/piston/cylinder alignment and reducing the tensions on the wire that forms said resonant spring 50.

In a way of carrying out the present invention, the deformation control device 60 is of the type provided around and along a wire extension of the resonant spring 50, said deformation control device 60 being, for example, a tubular coating which surrounds, integrally and circumferentially, the determined wire extension of the resonant spring 50. This solution presents as the main advantage the facility to mount the tubular coating around the spring wire.

Figure 2:
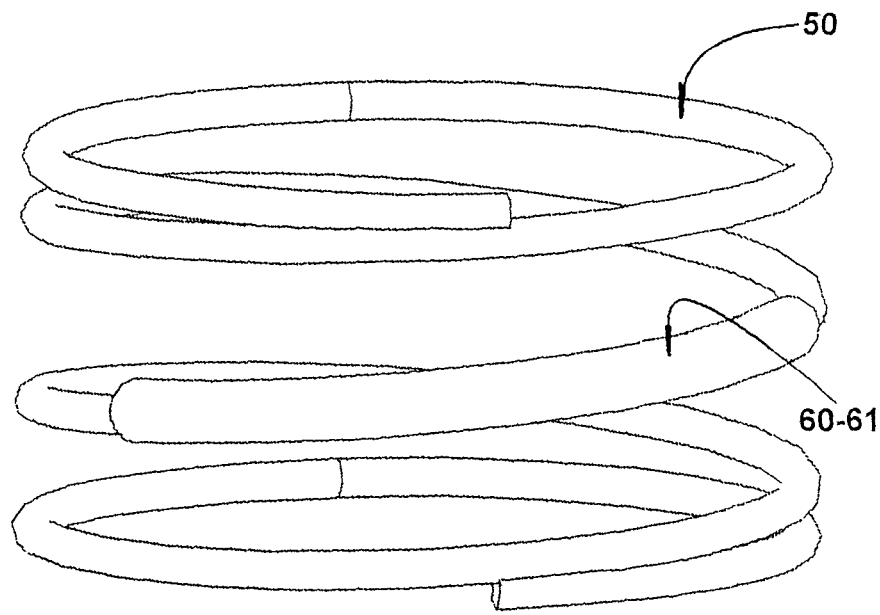
FIG. 2 represents, schematically, an enlarged perspective view of a portion of the resonant spring of a linear driving unit, such as that of FIG. 1, but carrying a deformation control device defined by an tubular coating in elastomer.

According to this concept, the control device of the resonant spring 60 can be, for example, a tubular coating 61 defined by an elastomer (FIG. 2), for example, rubber vulcanized directly on one or more wire extensions of the resonant spring 50 which are subject to undesirable radial or torsional deformations.

In another constructive option, not illustrated, the tubular coating 61 can be obtained in plastic material, for example, in a thermo-retractable plastic material. In this case, the mounting is also facilitated, with the coating being applied to the desired spring portion and then heated, with the heated material suffering a diameter reduction and remaining firmly mounted on the wire.

According to another way of carrying out the present invention, the deformation control device 60 is provided in helical development along one or more wire extensions of the resonant spring 50, maintaining direct contact with the latter, as illustrated in FIGS. 3, 4, 5 and 6.

In a particular form of this construction, the deformation control device 60 is defined by a damping spring 62 provided in helical development along a determined wire extension of the resonant spring 50. The use of such solution brings the advantage of having a low cost.

Figure 3:
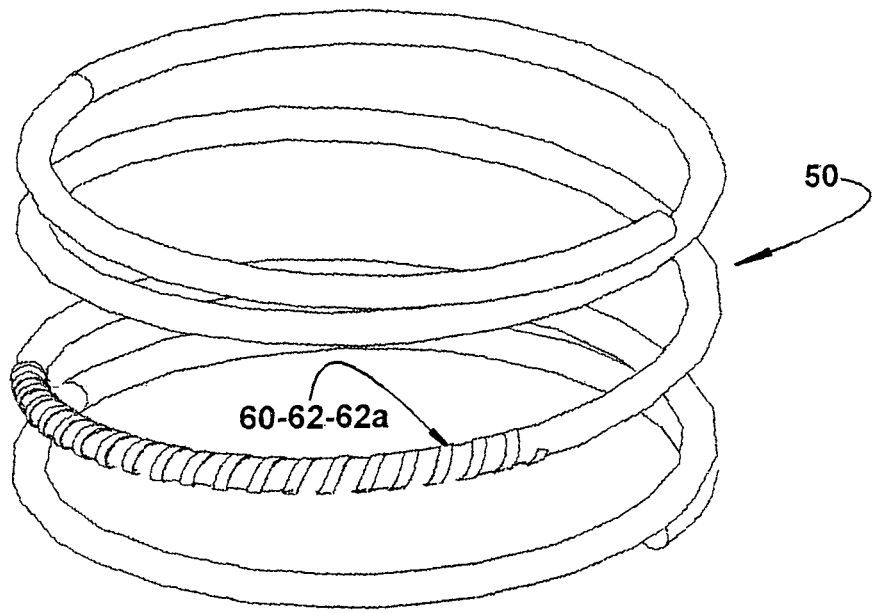
FIG. 3 represents, schematically, an enlarged perspective view of a portion of the resonant spring of a linear driving unit, such as that of FIG. 1, but carrying a deformation control device defined by a damping spring made of a strip.
Figure 4:
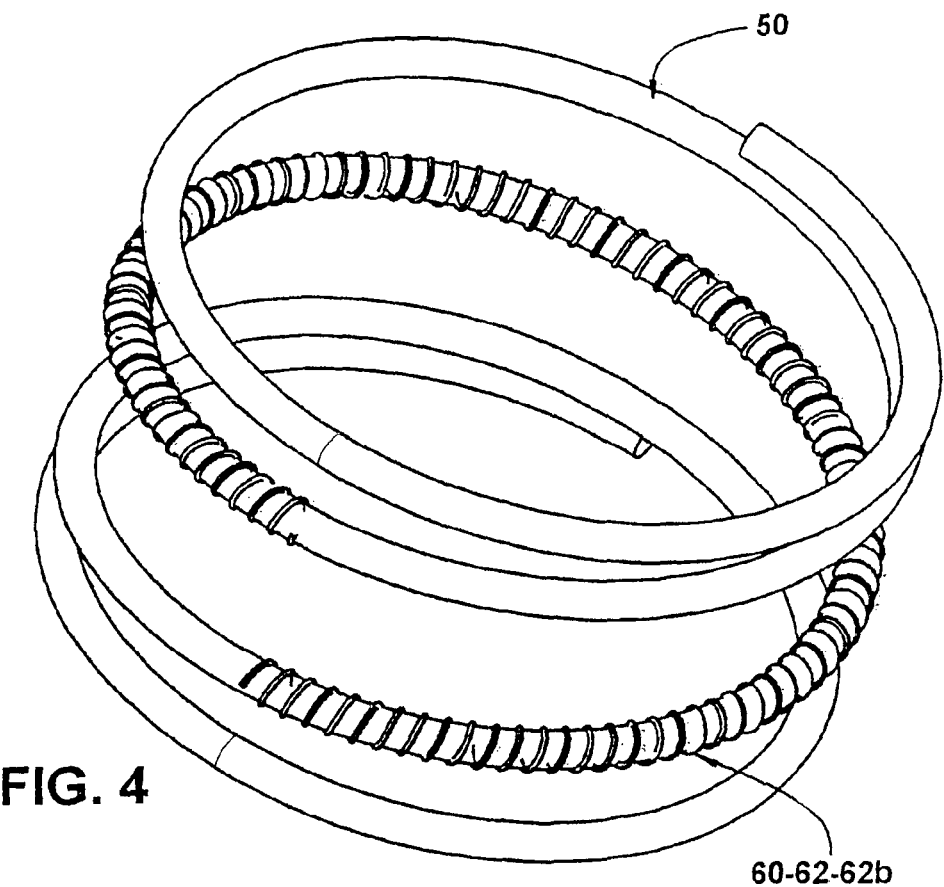
FIG. 4 represents, schematically, an enlarged perspective view of a portion of the resonant spring of a linear driving unit, such as that of FIG. 1, but carrying a deformation control device defined by a damping spring formed by a cylindrical wire.

According to this constructive concept, the deformation control device 60 can take the form of a helical spring made by a strip 62a or by a cylindrical rod 62b, in metal or synthetic material, which is helically mounted, directly and tightly around said wire extension of the resonant spring 50, such as respectively illustrated in FIGS. 3 and 4. This type of helical strip is also easy to be obtained and has a low cost, besides providing a larger area of contact with the wire portion of the resonant spring.

Figure 5:
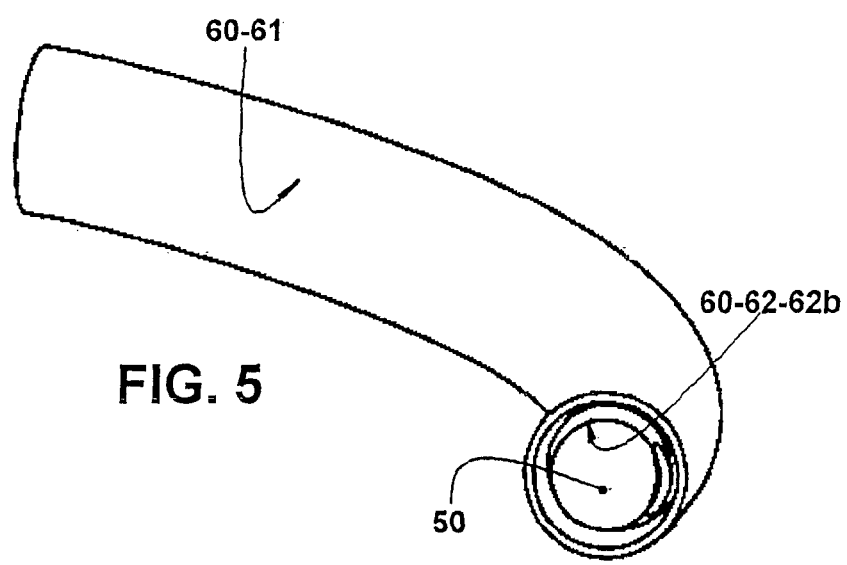
FIG. 5 represents, schematically, a cross-sectional view of a coil of the resonant spring illustrated in FIG. 4 and carrying the damping spring made of a cylindrical wire and surrounded by a thermo-retractable tubular coating.
Figure 6:
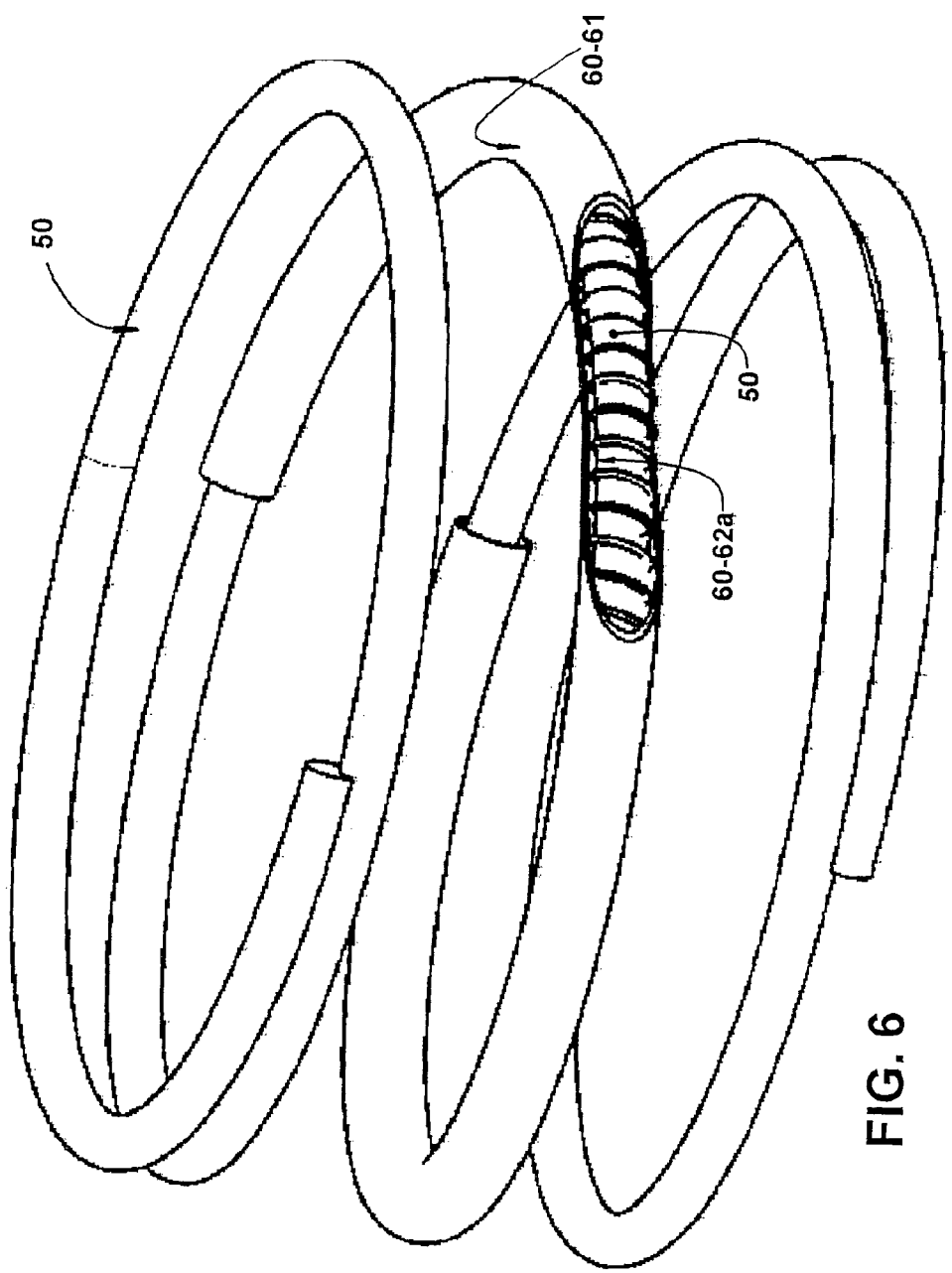
FIG. 6 represents, schematically, a partial longitudinal sectional view of the resonant spring illustrated in FIG. 4 and carrying the damping spring made of a cylindrical wire surrounded by a thermo-retractable tubular coating.

As illustrated in FIGS. 5 and 6, the deformation control device 60 can comprise, simultaneously, a damping spring 62 which is applied, directly and tightly, in helical development, around the wire of the resonant spring 50, and also a tubular coating 61 applied on the damping spring 62 and which can be made of different materials, such as vulcanized rubber, or thermo-retractable plastic, as already mentioned hereinbefore, increasing the effectiveness of the deformation control device.

The tubular coating 61 surrounds not only the wire of the resonant spring 50, but also the entire damping spring 62, forcing even more the contact between the damping spring 62 and the wire of the resonant spring 50, allowing that any undesirable radial or torsional deformations of the resonant spring 50 be transmitted to the deformation control device 60, providing at least one of said friction or deformation conditions, which are necessary to absorb, at least partially, the energy that generates said undesirable deformations of the resonant spring 50.

In said constructive option for the deformation control device 60 comprising the damping spring 62 and a tubular coating 61, in plastic material (thermo-retractable), the latter further allows the damping spring 62 to be more tightly mounted around the resonant spring 50, providing a better absorption of deformation energy of the resonant spring 50 through the deformation control device 60, by mutual friction or by deformation of the latter.

According to the present invention, the preferred constructive form for the deformation control device is the one of the type defined by a tubular coating made of elastomeric material, which is applied on the spring by a vulcanization process, since it is the most practical and allows the resonant spring 50 to be already delivered with the elastomeric material already applied and vulcanized thereon by the supplier of the elastomeric material.

The deformation control device 60 absorbs the energy from the resonant spring 50, transforming said energy into heat dissipated in the environment in which the deformation control device 60 is mounted. The absorbed energy is the one resulting from the specific vibration modes, other than the fundamental mode, which specific modes work against the desired coaxial operation of the piston 20 in the interior of the cylinder 10.

It should be understood that the deformation control device 60 may be provided in specific regions of the resonant spring 50, which are more prone to present the undesirable displacements, whereas its provision in the whole extension of the resonant spring 50 is prejudicial to the main displacement of said resonant spring 50.

In case the deformation control device 60 is a damping spring 62, this must be affixed against longitudinal displacements along the resonant spring 50. Such fixation can be achieved by applying adhesives to the base of flexible material.

Exemplifying, for a damping spring 62 in steel (in the form of wire or strip) there is, upon the deformation of the resonant spring 50, a rotation of the latter not followed by the material of the damping spring 62 and, in this difference of rotation between one element and the other, there is a relative movement between the confronting and adjacent surfaces of said elements, generating friction and heat between said surfaces and, consequently, taking energy from the system and impeding the undesirable deformations of the resonant spring 50.

In case the deformation control device 60 is in the form of a tubular coating 61, this additional element will absorb energy from the resonant spring 50, by deformation of its own structure.

Figure 7:
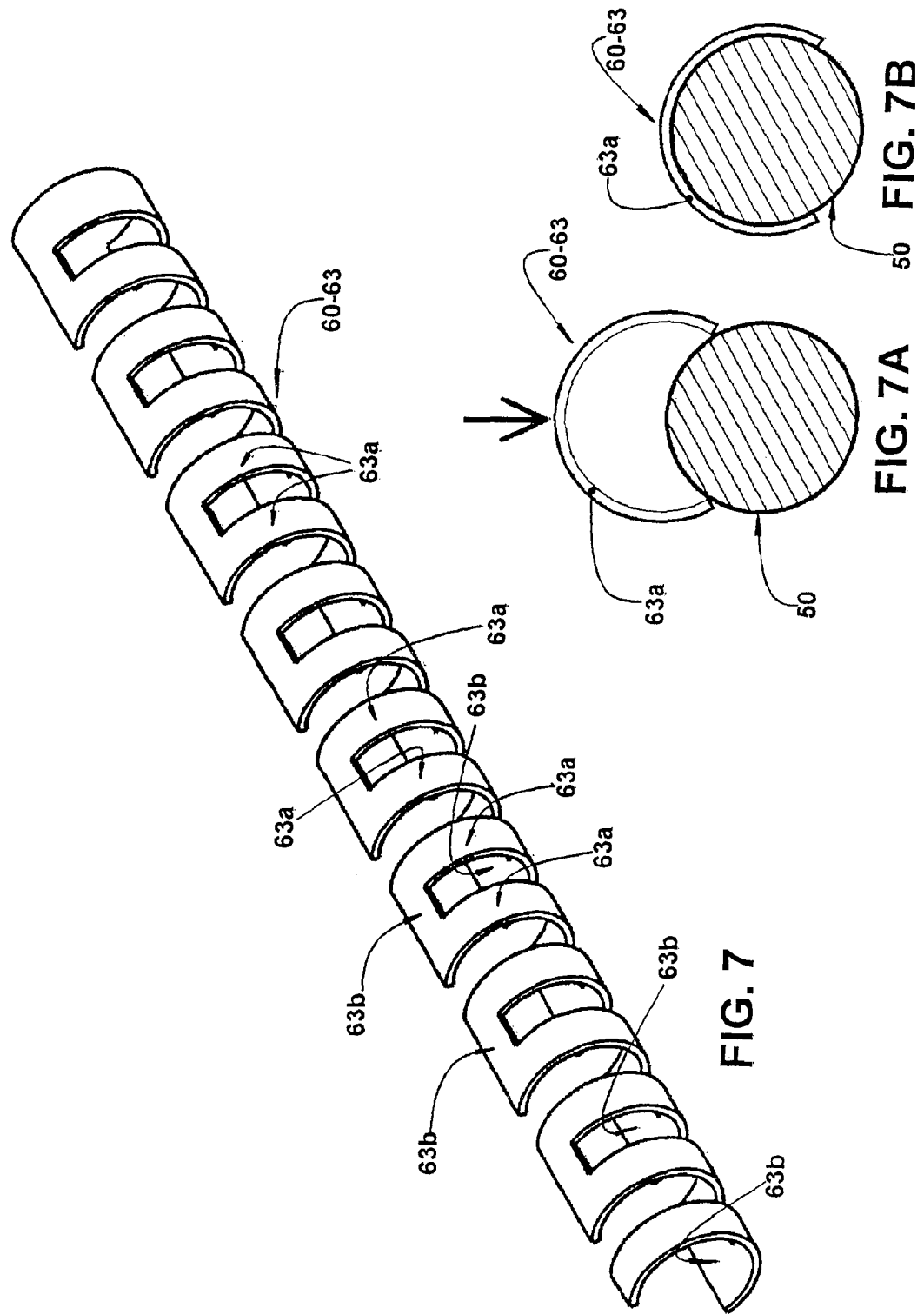
FIG. 7 illustrates a perspective view of a possible constructive form for the deformation control device, to be applied on a surface extension of the resonant spring.
Figure 8:
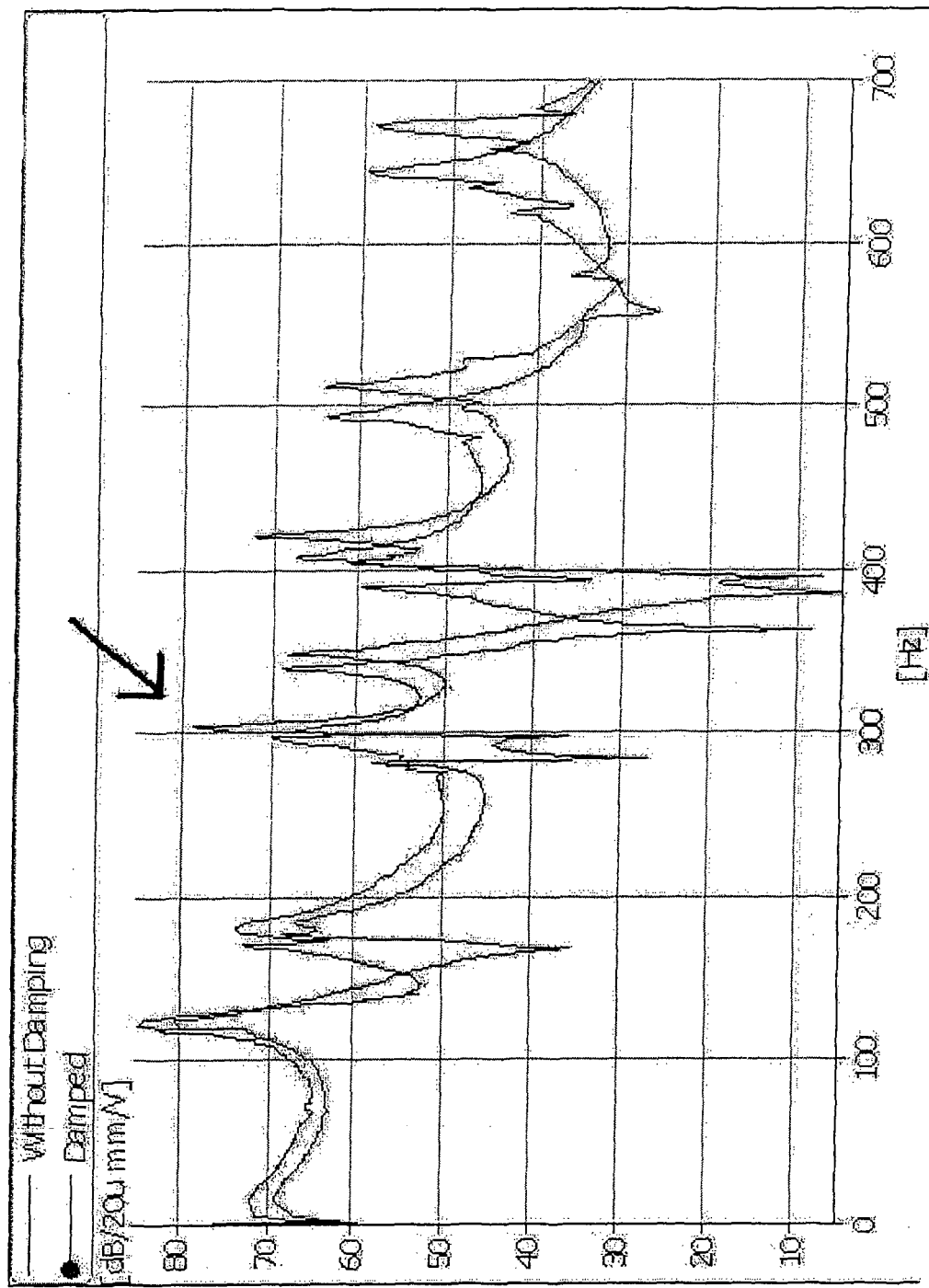
FIG. 8 represents, schematically, a graph illustrating the attenuation of vibration, by unit of frequency, obtained with the control device of the present solution.

According to another constructive form of the present invention, illustrated in FIG. 7, the deformation control device 60 is defined by a semi-tubular coating 63 which surrounds part of the circumferential contour of said surface extension of the resonant spring 50, maintaining direct contact with the latter. The semi-tubular coating 63 is defined, in a single piece, by a plurality of semi-annular segments 63a spaced apart and connected to one another.

In the construction illustrated in FIG. 7, the semi-annular segments 63a are disposed parallel and spaced from one another and also sequentially and alternately interconnected, at the ends thereof, through small longitudinal segments 63b. It should be understood that the semi-annular segments 63a can be interconnected by median longitudinal segments. Although not illustrated in the appended drawings, it should be understood that the semi-annular segments 63a may be not parallel to each other. Said semi-annular segments 63a may be interconnected by means of alternate end longitudinal segments, or by median longitudinal segments, or also directly by the ends thereof, alternately.

As it can be noted through FIGS. 7A and 7B, the circumferential extension of the semi-annular segments 63a are somewhat superior to the circumferential contour of the wire of the resonant spring 50, so as to allow the semi-tubular coating 63 to be easily mounted on the wire of the resonant spring 50 and, at the same time, to guarantee a reliable retention of the semi-tubular coating 63 on the resonant spring 50.

For any of the solutions above, the semi-tubular coating is preferably formed in plastic material or thermoplastic material, provided directly on the surface extension of the resonant spring 50, and said plastic material can be of the thermoretractable type.

As noted, the semi-tubular coating 63 can be easily mounted to the resonant spring 50, by elastic deformation, with no need of mounting it along the wire of the resonant spring 50, from an open end of the latter. In the case of the semi-tubular coating 63, the mounting can be made on the surface of the spring by elastic deformation of the semi-annular segments 63a.

It should be also pointed out that the semi-tubular coating 63 can be made of wire or strip in a metallic, plastic or thermoplastic material.

It should be understood that the different constructive variants of the invention described herein can be presented in particular constructions, or also partially or totally combined to one another.

While only some constructive variants for the present device have been illustrated herein, it should be understood that modifications of form and arrangement of the component elements of the proposed technical solution can be introduced, without departing from the inventive concept defined in the claims that accompany the present disclosure.

The invention claimed is:

1. A linear driving unit comprising:
  a linear electric motor formed by a motor housing, which is electrically excited and affixed to a fixed structure, and by a magnetic armature which is coupled to a piston through a coupling means and displaced by the electric excitation of the motor housing, in a reciprocating axial movement, said piston coupling means and magnetic armature defining a compression movable assembly;
  a helical resonant spring, having an end coupled to the fixed structure and an opposite end coupled to the magnetic armature in order to be displaced by the latter and elastically deformed, in a reciprocating axial movement, and operating as a guide for the axial displacement of the piston and also actuating on the compression movable assembly, jointly with the linear electric motor, an energy absorbing means being provided directly and tightly, along and around one or more wire extensions of the resonant spring which presents a structural vibratory mode differing from a main vibrational mode of elastic deformation and, wherein the wire extensions are subject to radial, lateral or torsional deformations upon the reciprocating axial movement of the resonant spring, said energy absorbing means maintaining direct contact with the surface of the wire extension in said specific regions of the resonant spring, and maintaining the alignment of the piston/spring/cylinder and reducing stress over the spring wire;
  wherein the energy absorbing means is defined by one of a tubular coating and a semi-tubular coating, which surrounds part of the circumferential contour of said wire extension of the resonant spring, maintaining direct contact with the latter, said energy absorbing means being defined, in a single piece, by a plurality of semi annular segments which are spaced apart and connected to one another.

2. The linear driving unit, according to claim 1, wherein the semi-annular segments are sequentially and alternately interconnected by their ends.

3. The linear driving unit, according to claim 2, wherein the semi-annular segments are parallel to each other and interconnected by small longitudinal segments.

4. The linear driving unit, according to claim 1, wherein the semi-tubular coating is formed by one of the materials defined by metallic strip, metallic wires, plastic material, thermoplastic material and thermoretractable plastic material, provided directly on the surface of the resonant spring.

* * * * *